US010802127B2

(12) United States Patent
Mueller et al.

(10) Patent No.: US 10,802,127 B2
(45) Date of Patent: Oct. 13, 2020

(54) RADAR FILL LEVEL MEASUREMENT DEVICE

(71) Applicant: VEGA Grieshaber KG, Wolfach (DE)

(72) Inventors: Christoph Mueller, Oppenau (DE); Daniel Schultheiss, Hornbergand (DE); Michael Fischer, Alpirsbach (DE)

(73) Assignee: VEGA GRIESHABER KG, Wolfach (DE)

( * ) Notice: Subject to any disclaimer, the term of this patent is extended or adjusted under 35 U.S.C. 154(b) by 337 days.

(21) Appl. No.: 15/663,015

(22) Filed: Jul. 28, 2017

(65) Prior Publication Data
US 2018/0031687 A1 Feb. 1, 2018

(30) Foreign Application Priority Data

Aug. 1, 2016 (EP) .................................... 16182151

(51) Int. Cl.
*G01S 13/34* (2006.01)
*G01S 7/40* (2006.01)
(Continued)

(52) U.S. Cl.
CPC ............ *G01S 13/34* (2013.01); *G01F 23/244* (2013.01); *G01F 23/284* (2013.01);
(Continued)

(58) Field of Classification Search
CPC ........ G01S 13/34; G01S 7/034; G01S 7/4017; G01S 13/40; G01F 23/244; G01F 23/284; G01F 25/0007
(Continued)

(56) References Cited

U.S. PATENT DOCUMENTS 4,680,538 A * 7/1987 Dalman ................. G01R 27/04
324/601
5,589,838 A * 12/1996 McEwan ............... G01F 23/284
342/387
(Continued)

FOREIGN PATENT DOCUMENTS

CN 101876703 A 11/2010
CN 104034391 A 9/2014
(Continued)

OTHER PUBLICATIONS

Extended European Search Report dated Feb. 6, 2017 for European Patent Application No. 16182151.7.
(Continued)

*Primary Examiner* — Timothy A Brainard
*Assistant Examiner* — Nuzhat Pervin
(74) *Attorney, Agent, or Firm* — Hunton Andrews Kurth LLP

(57) ABSTRACT

A radar fill level measurement device can be provided, which comprises a frequency synthesizer configured to generate an oscillator signal, a high-frequency signal generation module configured to generate a transmission signal based on the oscillator signal, and an energy-supply module configured to supply electrical energy to the frequency synthesizer and the high-frequency signal generation module. Associated methods and computer-accessible medium can also be provided. The frequency synthesizer can comprise a control device, a reference oscillator and a phase-locked loop. The phase-locked loop can comprise a phase-locked device and an oscillator. The phase-locked loop can be configured to adjust a frequency of the oscillator signal to a target value, and the phase-locked device can be configured to provide a control signal for the control device when the frequency of the oscillator signal has reached the target value. The control device can also be configured to actuate (Continued)

the energy-supply module to supply the electrical energy to the high-frequency signal generation module before the control signal is provided by the phase-locked device.

17 Claims, 5 Drawing Sheets

(51) Int. Cl.
    *G01S 7/03*     (2006.01)
    *G01S 13/40*     (2006.01)
    *G01F 23/24*     (2006.01)
    *G01F 25/00*     (2006.01)
    *G01F 23/284*     (2006.01)

(52) U.S. Cl.
    CPC .......... *G01F 25/0007* (2013.01); *G01S 7/034* (2013.01); *G01S 7/4017* (2013.01); *G01S 13/40* (2013.01)

(58) Field of Classification Search
    USPC .......................................................... 342/124
    See application file for complete search history.

(56) References Cited

U.S. PATENT DOCUMENTS

| | | | | |
|---|---|---|---|---|
| 7,039,380 | B2 * | 5/2006 | Jahene | H03L 7/099 |
| | | | | 327/156 |
| 7,460,057 | B2 | 12/2008 | Fehrenbach et al. | |
| 8,405,542 | B2 | 3/2013 | Corbe et al. | |
| 9,291,443 | B2 * | 3/2016 | Kleman | G01S 13/347 |
| 9,431,958 | B2 * | 8/2016 | Boos | H03B 5/32 |
| 9,800,203 | B2 * | 10/2017 | Boos | H03B 5/32 |
| 9,825,639 | B2 * | 11/2017 | Patrizi | H03L 7/1075 |
| 2003/0222654 | A1 * | 12/2003 | Furse | G01F 23/0069 |
| | | | | 324/543 |
| 2005/0200516 | A1 * | 9/2005 | Brown | G01S 13/424 |
| | | | | 342/90 |
| 2007/0182619 | A1 * | 8/2007 | Honda | H01Q 25/02 |
| | | | | 342/80 |
| 2010/0277359 | A1 * | 11/2010 | Ando | G01S 7/4008 |
| | | | | 342/70 |
| 2012/0079890 | A1 * | 4/2012 | Ueberschlag | G01S 15/12 |
| | | | | 73/861.27 |
| 2012/0218014 | A1 * | 8/2012 | Burg | H03L 7/1976 |
| | | | | 327/156 |
| 2014/0218086 | A1 * | 8/2014 | Burg | H03L 7/16 |
| | | | | 327/159 |
| 2014/0253147 | A1 * | 9/2014 | Kleman | G01B 7/26 |
| | | | | 324/644 |
| 2015/0372644 | A1 * | 12/2015 | Boos | H04L 27/20 |
| | | | | 331/46 |

FOREIGN PATENT DOCUMENTS

| | | | | |
|---|---|---|---|---|
| DE | 102005057094 A1 | | 6/2007 | |
| EP | 2161551 A1 | | 3/2010 | |
| EP | 2166671 A2 * | | 3/2010 | .......... G01F 23/284 |
| EP | 2166671 A2 | | 3/2010 | |
| EP | 2681966 B1 * | | 10/2016 | .......... H03L 7/1976 |
| EP | 2681844 B1 * | | 6/2018 | ............. H03L 7/113 |
| WO | 8600476 A1 | | 1/1986 | |
| WO | WO-8600476 A1 * | | 1/1986 | ............... H03C 1/06 |
| WO | 9832028 A1 | | 7/1998 | |
| WO | WO-9832028 A1 * | | 7/1998 | .......... G01S 13/325 |
| WO | 0152418 A1 | | 7/2001 | |
| WO | WO-0152418 A1 * | | 7/2001 | .......... H03L 7/0895 |
| WO | WO-2009083501 A2 * | | 7/2009 | ............. H03L 7/085 |

OTHER PUBLICATIONS

Foreign language First Chinese Office action dated Jun. 23, 2020 issued for Chinese Patent Application No. 201710638612.7.
English translation of summary of first Chinese Office action dated Jun. 23, 2020 issued for Chinese Patent Application No. 201710638612.7.

* cited by examiner

RADAR FILL LEVEL MEASUREMENT DEVICE

CROSS-REFERENCE TO RELATED APPLICATION(S)

This application claims the benefit of and priority from European Patent Application No. 16 182 151.7 filed on Aug. 1, 2016, the entire disclosure of which is incorporated herein by reference.

FIELD OF THE DISCLOSURE

The present disclosure relates in general to the field of radar-based fill level measurement, and in particular to a radar fill level measurement device, a method for operating a radar fill level measurement device, a program element for a radar fill level measurement device, and to a computer-readable medium comprising a computer processor executing computer-executable instructions.

BACKGROUND INFORMATION

Radar fill level measurement devices, e.g., radar sensors for fill level measurement, can comprise high-frequency modules and/or high-frequency circuits which are often operated in a clocked manner. Such clocked operation can involve alternately passing through active periods and inactive periods of operation, with measurement signals being emitted towards the filling material during the active periods, and no measurement signals being sent during the inactive periods.

In order to save energy, during the inactive periods the entire high-frequency module or at least some of the components of the high-frequency module is/are disconnected from an energy supply, for example, a voltage supply and/or a current supply. Since the components of the high-frequency modules usually belong to the largest consumers of electrical energy in the radar fill level measurement device, a measuring rate of the radar fill level measurement device may thus be increased when the energy supply is specified and/or limited.

Another reason why radar fill level measurement devices are normally operated in a clocked manner is to comply with statutory emission limits for high-frequency radar signals, in order to be allowed to use the radar fill level measurement device in containers and/or outdoors, for example. If a measurement signal is not sent without interruption, in particular the high-frequency component of the emitted measurement signal, the average emitted power or the average transmission power of the radar fill level measurement device may be correspondingly reduced in this way.

There is a need to address at least some of the issues and/or deficiencies described herein.

OBJECTS AND SUMMARY OF EXEMPLARY EMBODIMENTS

One of the objects of the present disclosure may be to provide a reliable, energy-efficient radar fill level measurement device, the functionality of which may be checked and/or monitored, in particular during clocked operation.

This exemplary object is achieved with the exemplary embodiments of the present disclosure which are described herein.

One exemplary embodiment of the present disclosure relates to a radar fill level measurement device for determining a fill level of a filling material, in particular of a filling material in a container. The radar fill level measurement device may be a radar sensor and/or a sensor for measuring a fill level. The radar fill level measurement device can comprise a frequency synthesizer for generating an oscillator signal. The frequency synthesizer may be or include a frequency generator, a frequency generator module and/or a frequency generator circuit for generating the oscillator signal. Furthermore, the radar fill level measurement device can comprise a high-frequency module and/or a high-frequency circuit for generating a transmission signal based on the oscillator signal. The high-frequency module may be configured to modify the frequency and/or power of the oscillator signal and to thereby generate the transmission signal. The transmission signal may then be passed or conveyed to an antenna and/or an antenna arrangement, for example, and be emitted from the radar fill level measurement device in the form of a measurement signal, transmission signal or radar signal to measure and/or determine the fill level.

Furthermore, the radar fill level measurement device an comprise an energy-supply module, an energy supply and/or an energy-supply arrangement for supplying at least a part of the frequency synthesizer and the high-frequency module with electrical energy, i.e. the energy-supply module is configured to supply a current and/or a voltage. At least the frequency synthesizer and the high-frequency module can form a radar module of the radar fill level measurement device. The frequency synthesizer can comprise a control unit/device and/or a phase-locked loop which can include a phase-locked element and an oscillator, the phase-locked loop being configured to adjust and/or control the frequency of the oscillator signal to a target value. The phase-locked element can be configured to provide and/or send a control signal for the control unit when the frequency of the oscillator signal has reached the target value. Therein, the control unit/device can be configured to actuate and/or activate the energy-supply module to supply the high-frequency module with electrical energy before the control signal is provided by the phase-locked element. The control unit/device may be a control circuit, a control circuitry and/or a control module.

For example, the radar fill level measurement device can be configured for a clocked operation, in which a measurement signal is emitted during active periods and/or phases of operation, and an energy supply to at least a part of the high-frequency module can be interrupted and/or reduced during inactive periods and/or phases.

The control unit/device or arrangement (e.g., a controller) may be or include an arithmetic unit/device, an arithmetic module, a logic apparatus and/or a processor, for example. The oscillator can be or include, e.g., a voltage-controlled oscillator (VCO).

The phase-locked loop may generally be or include a closed control loop, using which a phase position and/or frequency of the oscillator can be adjusted so that a phase deviation between a reference signal and oscillator signal and/or a signal derived therefrom is as constant as possible. The phase-locked element may be or include a phase locked loop (PLL) component, which compares the reference signal, which is, e.g., provided by a reference oscillator, with the oscillator signal. The values for a desired phase deviation can be passed from the control unit/device to the phase-locked element, for example. The control signal from the phase-locked element can be or include a digital signal, which can be provided, e.g., at a signal output of the phase-locked element, and indicates that the phase deviation has reached the desired value, and therefore the frequency of the oscillator signal can match the target value.

Thus, the exemplary radar fill level measurement device according to an exemplary embodiment of the present disclosure can be configured to activate the frequency synthesizer during clocked operation, e.g., by actuating the energy-supply module to supply the frequency synthesizer with electrical energy, and to already actuate the energy-supply module during a settling time. For example, during the settling time, the frequency of the oscillator signal can be adjusted to the target value, such that the high-frequency module is also supplied with electrical energy. In this exemplary manner, it is possible to ensure on the one hand that, as soon as the target value has been reached and the control signal has been issued or output, most or all components of the radar fill level measurement device can be ready for operation and a fill level measurement may immediately be carried out. On the other hand, the control signal can be used to check the functionality of the synthesizer before emitting a measurement signal. That means that the radar fill level measurement device may facilitate the frequency synthesizer to be monitored on the basis of the control signal as a condition for the emission of the measurement signal in response to the control signal. In such exemplary case, the frequency synthesizer and the high-frequency module can be supplied with electrical energy, either at the same time or at different times, by correspondingly actuating the energy-supply module, and, when the control signal is present, the transmission signal may be passed to the antenna and a measurement signal may be emitted via the antenna.

According to an exemplary embodiment of the present disclosure, the control unit/device can be configured to measure the fill level in response to the control signal. The measurement can be initiated, e.g., by the high-frequency module being instructed by the control unit/device to emit the transmission signal to an antenna and/or an antenna arrangement of the radar fill level measurement device in order to determine the fill level. For example, the phrase "starting the measurement" may mean, but not limited to, that a measurement signal is emitted via a transmission channel of the radar fill level measurement device and/or a reflected radar signal is received via a receiving channel and may then be evaluated in order to determine the fill level. The measurement may also be started by sweeping the frequency, starting from a starting frequency, across a frequency sweep in a frequency modulated continuous wave (FMCW) operation and/or a stepped frequency continuous wave (SFCW) operation.

According to another exemplary embodiment of the present disclosure, the control unit/device can be configured to monitor the control signal continuously while a frequency sweep is performed by the frequency synthesizer. Thus, the functionality of the frequency synthesizer may be continuously checked, monitored, controlled and/or ensured as the frequency sweep is performed. In or during the frequency sweep, the frequency of the transmission signal and/or the measurement signal can be swept over the frequency sweep from a starting frequency to an end frequency, which can be higher than the starting frequency. The frequency sweep may also be referred to as frequency ramp.

According to yet another exemplary embodiment of the present disclosure, the control unit/device can be configured to measure and/or determine the fill level after a definable, programmable and/or dynamically adaptable waiting time is over. The waiting time can be selected to be of such a length that, once completed or finished, it is possible to ensure that the frequency of the oscillator signal has reached the target value and the high-frequency module is in a settled state and/or is ready for use. In general, the radar fill level measurement device can be configured such that, once the energy-supply module is actuated to supply the frequency synthesizer and the high-frequency module with electrical energy, and once the waiting time is over and the control signal is present, a fill level measurement can be performed.

According to still another exemplary embodiment of the present disclosure, the energy-supply module can comprise a first output for supplying the frequency synthesizer with energy, e.g. electrical energy, and a second output for supplying the high-frequency module with energy, e.g. electrical energy. The first output and the second output can be actuated and/or are actuatable by the control unit/device independently of one another and/or separately from one another. Alternatively or in addition, the energy-supply module can comprise a first energy-supply unit/device for supplying the frequency synthesizer with electrical energy, and a second energy-supply unit/device for supplying the high-frequency module with electrical energy. The first energy-supply unit/device and the second energy-supply unit/device may be actuated and/or are actuatable by the control unit/device independently of one another and/or separately from one another. In other words, the energy-supply module can be configured such that the frequency synthesizer and the high-frequency module may be supplied with energy and/or operated independently of one another and/or separately.

According to a further exemplary embodiment of the present disclosure, the frequency synthesizer can also comprise a reference oscillator for issuing and/or outputting a reference signal to the phase-locked loop. The reference oscillator can provide the phase-locked element with the reference signal, for example, so that a preset phase deviation between the reference signal and the oscillator signal may be set.

According to an additional exemplary embodiment of the present disclosure, the phase-locked loop can further comprise a loop filter for filtering a signal that is passed from the phase-locked element to the oscillator. The loop filter may therefore be arranged and/or placed between the phase-locked element and the oscillator.

In another exemplary embodiment of the present disclosure, the radar fill level measurement device can further comprise a control module for monitoring electrical energy that is supplied to the high-frequency module by the energy-supply module. The control module can be configured to issue and/or output a control signal to the control unit/device if preset values for the energy supply to the high-frequency module are exceeded or fallen below (undershot). The control module can be or include an energy-supply monitoring device, for example, for monitoring current and/or voltage. If the energy consumption of the high-frequency module rises above a certain threshold value or falls below, e.g., a certain further threshold value, this can indicate that a component of the high-frequency module is malfunctioning. The functionality of the high-frequency module can therefore advantageously be checked and/or monitored during operation using the control module.

According to an additional exemplary embodiment of the present disclosure, the high-frequency module can comprise a first coupler, a second coupler, a power regulator for adjusting the power of the transmission signal, and a power detector for checking and/or determining the power. An input of the first coupler can be connected to an output of the frequency synthesizer, and an output of the first coupler is connected to an input of the power regulator. For example, the oscillator signal is passed to the power regulator via the first coupler. Furthermore, an output of the power regulator can be connected to an input of the second coupler, and the second coupler is configured to supply at least a part of the power of the transmission signal to the power detector. One or both of the first and second couplers may be or include, e.g., a directional coupler, a power divider and/or a hybrid coupler. The power regulator can be or include a variable and/or adaptive power regulator. For example, the high-frequency module can comprises a coupler that can couple out some of the transmission signal and supplies it to a power detector for determining the power.

In another exemplary embodiment of the present disclosure, the power detector can be connected to the control unit/device, and the control unit/device can be configured to determine the power of the transmission signal on the basis of a signal that is provided by the power detector and correlates with the power of the transmission signal. Therein, the control unit/device can be coupled to the power regulator, and configured to adjust and/or control the power regulator, e.g., based on the determined power of the transmission signal. Using the power detector, the power of the transmission signal can therefore advantageously be checked before the measurement signal is emitted via the antenna.

According to yet another exemplary embodiment of the present disclosure, the control unit/device can be configured to minimize the power of the transmission signal and/or to set a minimum value for the power during a settling time by adjusting the power regulator. Alternatively or additionally, the control unit/device can be configured to increase the power of the transmission signal to a desired and/or pre-determined target power value immediately before a fill level measurement. For example, the power regulator can be switched from a low amplification to a desired higher amplification immediately before a frequency sweep begins. This can advantageously reduce or prevent unwanted measurement signals being emitted during inactive periods during clocked operation and/or during the settling time of the frequency synthesizer.

In still another exemplary embodiment of the present disclosure, the power regulator can be or include a variable amplifier and/or a variable attenuator. Therefore, the power of the transmission signal can be reliably adjusted.

Another exemplary embodiment of the present disclosure relates to a method for operating a radar fill level measurement device, which can comprise a frequency synthesizer for generating an oscillator signal, a high-frequency module for generating a transmission signal based on the oscillator signal, and an energy-supply module for supplying the frequency synthesizer and the high-frequency module with electrical energy. The method can comprise the following exemplary steps/procedures:

actuating the energy-supply module to supply the frequency synthesizer with electrical energy;
adjusting the frequency of the oscillator signal to a preset target value using a phase-locked loop of the frequency synthesizer;
providing a control signal using a phase-locked element of the phase-locked loop when the frequency of the oscillator signal matches the target value; and
actuating the energy-supply module to supply the high-frequency module with electrical energy before the control signal is provided.

Exemplary features and elements of the exemplary radar fill level measurement device described above and below can be or include features, steps and/or procedures of the exemplary method described above and below. Likewise, features, steps and/or procedures of the exemplary method may be or include features, components steps and/or procedures of the exemplary radar fill level measurement device.

In another exemplary embodiment of the present disclosure relates to a control unit/device of a radar fill level measurement device executing computer-executable instructions, which when executed, configure the radar fill level measurement device to carry out the steps and/or procedures of the exemplary method described herein above and below.

Another aspect of the present disclosure relates to a computer-readable medium storing computer-executable instructions thereon which, when executed on a control unit/device of a radar fill level measurement device, instruct the radar fill level measurement device to carry out the steps of the exemplary method described above and below.

Exemplary embodiments of the present disclosure are described in the following with reference to the accompanying drawings. In the drawings, the same reference signs can denote elements that are identical, similar or have the same function.

Each and every exemplary embodiment and aspect described herein, and their components, portions, configurations, procedures and procedures can be performed, combined and interchanged with one or more of other exemplary embodiments and aspects described herein.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1:
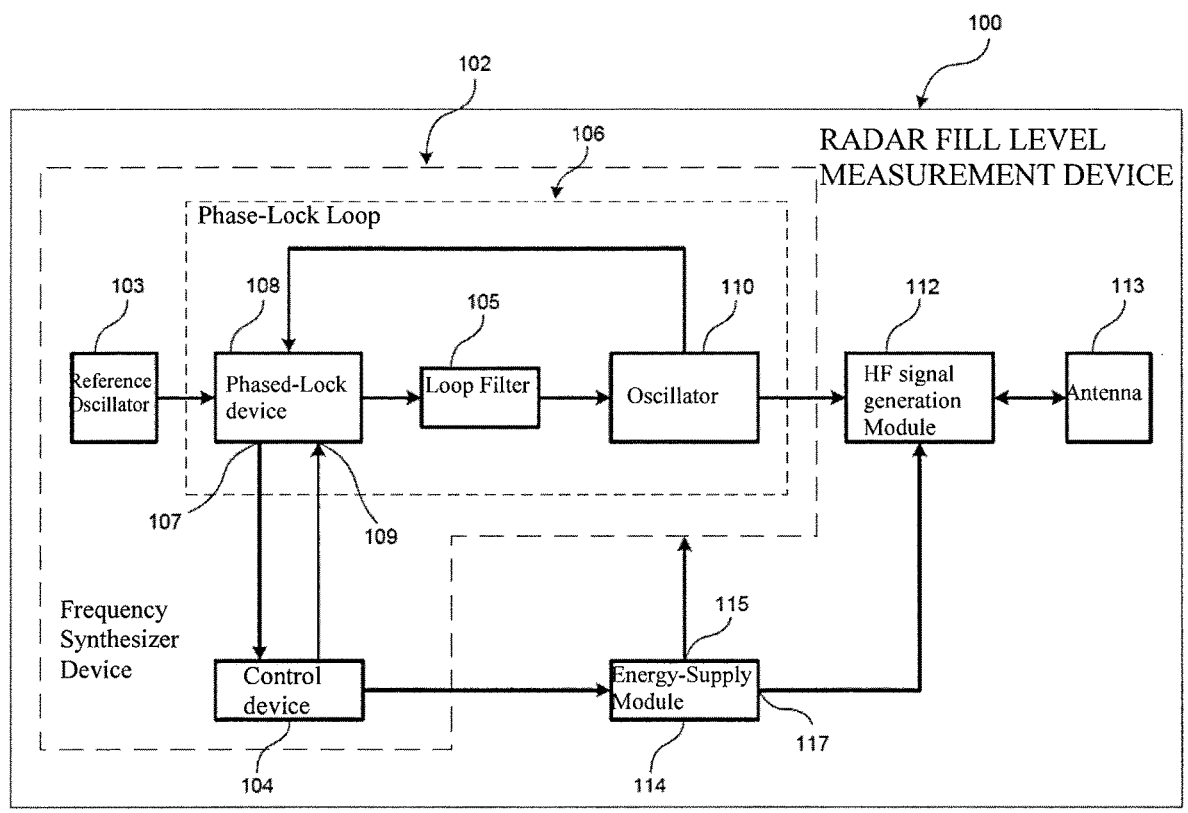
FIG. 1 is a block diagram of a radar fill level measurement device according to an exemplary embodiment of the present disclosure.

Throughout the drawings, the same reference numerals and characters, unless otherwise stated, are used to denote like features, elements, components, or portions of the illustrated embodiments. The views in the drawings are merely schematic and are not to scale. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

FIG. 1 shows a block diagram of a radar fill level measurement device 100 according to an exemplary embodiment of the present disclosure, the components of the radar fill level measurement device 100 being shown as a block diagram. The exemplary radar fill level measurement device 100 can comprises a frequency synthesizer 102 for generating an oscillator signal. The frequency synthesizer 102 can comprise a control unit/device 104, a reference oscillator 103 and a phase-locked loop 106.

The phase-locked loop 106 can comprise a phase-locked element (PLL) 108, to which a reference signal generated by the reference oscillator 103 is supplied via a corresponding input. Furthermore, the phase-locked loop 106 comprises a loop filter 105, which can be placed between the phase-locked element 108 and an oscillator 110. The phase-locked loop 106 can be a closed control loop, using which a phase position and/or frequency of the oscillator 110 can be adjusted. With such exemplary adjustment, a phase deviation between the reference signal and the oscillator signal and/or a signal derived therefrom can be kept as constant as possible. The oscillator 110 can be or include, e.g., a voltage-controlled oscillator (VCO).

The phase-locked element 108 can receive control signals from the control unit/device 104 via a control input 109. A target value may be set for a frequency of the oscillator signal, and/or the phase-locked element 108 can be programmed via the control input 109, for example. If the frequency of the oscillator signal corresponds to the target value, a digital control signal can be issued and/or output to the control unit/device 104 via a signal output 107. The control signal can also be referred to as a "lock detect" signal.

The exemplary radar fill level measurement device 100 also comprises a high-frequency module 112, which can generate a transmission signal on the basis of the oscillator signal. Furthermore, the exemplary radar fill level measurement device 100 can further comprise an antenna 113 and/or an antenna arrangement 113, to which the transmission signal can be supplied and using which, a measurement signal based on the transmission signal can be emitted for the actual measurement of the fill level. Furthermore, the exemplary radar fill level measurement device 100 can comprise an energy-supply module 114 for supplying the frequency synthesizer 102 and the high-frequency module 112 with electrical energy. The energy-supply module 114 is coupled and/or connected to the control unit/device 104, and may be actuated and/or controlled using the control unit/device 104. The frequency synthesizer 102 and the high-frequency module 112 may be supplied with energy separately from one another and/or independently of one another. For this purpose, the energy-supply module 114 may comprise a first output 115 or a first energy-supply unit/device 115 for supplying the frequency synthesizer 102 with energy, and a second output 117 or second energy-supply unit/device 117 for supplying the high-frequency module 112 with energy, which second output or unit unit/device be actuated independently of the control unit/device 104.

In one exemplary embodiment of the present disclosure, the control unit/device unit 104 of the radar fill level measurement device 100 can be configured to actuate and/or activate the energy-supply module 114. This can be performed so as to supply the high-frequency module 112 with electrical energy before the control signal is provided by the phase-locked element 108, e.g., before the frequency of the oscillator signal corresponds to the target value. Therefore, during a settling time, e.g., at which time, the frequency of the oscillator signal is adjusted to the target value, the high-frequency module 112 can already be activated. Furthermore, the control unit/device 104 can be configured to perform a fill level measurement in response to the control signal, e.g., by sweeping a frequency of the transmission signal and/or a measurement signal across a frequency sweep starting from a starting frequency.

One exemplary mode of operation of the exemplary radar fill level measurement device according to the exemplary embodiment of the present disclosure may be as follows. For example, the radar fill level measurement device 100 can be operated in various operating modes, and it possible to generate transmission signals and/or measurement signals having different modulation modes using the frequency synthesizer 102. In radar-based fill level measurements, common operating modes and/or modulation modes are a frequency modulated continuous wave (FMCW) and a stepped frequency continuous wave (SFCW). The energy-supply module 114 can supply the individual components of the frequency synthesizer 102 and active components of the high-frequency module 112 with electrical energy. As described herein, the supply to the frequency synthesizer 102 and to the high-frequency module 112 can be actuated separately by the control unit/device 104, e.g., switched on and off. Voltage can be supplied to the control unit/device 104 and to the reference oscillator 103, which are not shown in FIG. 1 for reasons of clarity.

If the energy supply to the frequency synthesizer 102 is activated, the phase-locked loop 106 can adjust the frequency of the oscillator 110 during a settling time to the preset and/or desired target value. At the same time or at a different time, the energy supply to the high-frequency module 112 can also be activated so that the frequency module 112 is also fully operational during the settling time, once this period is over and/or after a certain additional waiting time. If the frequency of the oscillator signal corresponds to the target value, e.g., if the oscillator 110 is at its target frequency and if the phase-locked loop 106 is locked, the phase-locked element 108 can issue and/or output the control signal or the "lock detect" signal to the control unit/device 104. Using such control signal, the correct output frequency of the oscillator 110 or the correct frequency of the oscillator signal—and thus also the correct frequency of the transmission signal—can be passed to the antenna 113 and the measurement signal emitted by the antenna 113 can thus be advantageously monitored.

Thus, using the radar fill level measurement device 100 according to the exemplary embodiment of the present disclosure, the fill level measurement or the distance measurement may therefore advantageously only be initiated, e.g., the frequency sweep can only be started using the FMCW or SFCW modulation, after the frequency of the oscillator has reached the correct starting frequency of the frequency sweep. The correct function of the frequency synthesizer 102 can therefore also be ensured for each fill level measurement. In addition, the functionality and/or correct function of the frequency synthesizer 102 may also be continuously checked during operation of the exemplary radar fill level measurement device 100.

Figure 2:
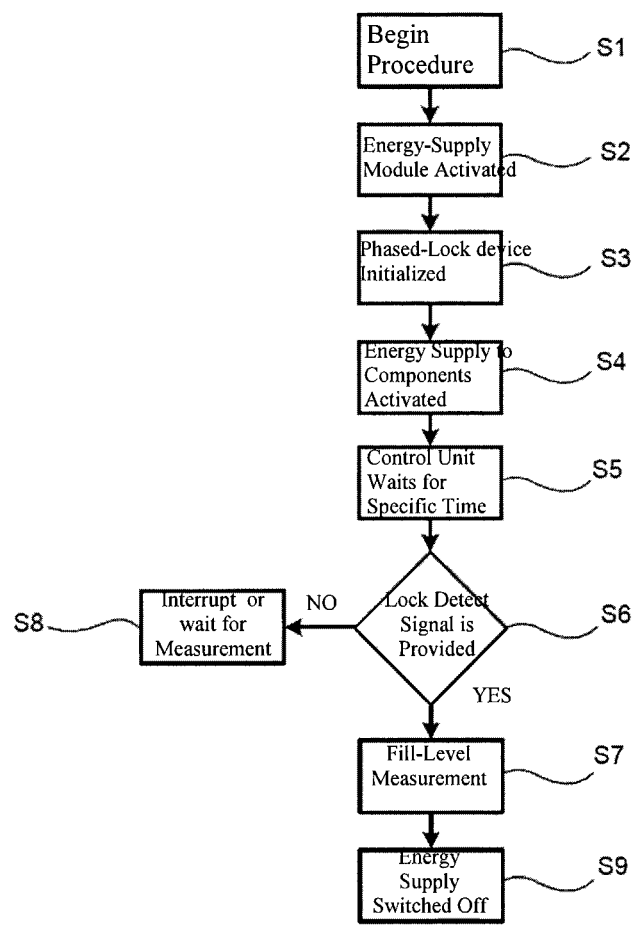
FIG. 2 is a flow diagram illustrating steps and/or procedures of a method for operating the radar fill level measurement device shown in FIG. 1 according to an exemplary embodiment of the present disclosure.

FIG. 2 illustrates a flow diagram for illustrating exemplary steps and/or procedures of an exemplary method for operating the exemplary radar fill level measurement device 100 of FIG. 1 according to an exemplary embodiment of the present disclosure.

For example, in a first step/procedure S1, a measurement routine is begun, and in a second step/procedure S2, the energy-supply module 114 is actuated by the control unit/device 104. Such activation occurs in S2 so that the frequency synthesizer 102 or the components thereof are supplied with electrical energy via the first output 115 of the energy-supply module 114. For example, in S2, the energy supply to the reference oscillator 103, the phase-locked element 108, the oscillator 110 and optionally the loop filter 105 can be switched on by the control unit/device 104.

In another step/procedure S3, the phase-locked element 108 is initialized by the control unit/device 104, in which a register of the phase-locked element 108 can be programmed by the control unit/device 104 via, e.g., the control input 109, and a target value may be set, e.g., for the frequency of the oscillator signal. As soon as the initialization of the phase-locked element 108 is completed, the frequency of the oscillator signal and/or the frequency of the oscillator 110 can be adjusted to the target value, e.g., to the target frequency. In FMCW or SFCW operation, the target value of the frequency can be, e.g., a starting frequency of the frequency sweep. Depending on the exemplary design of the phase-locked loop 106, adjusting the frequency to the target value can include a known settling time.

During the settling time, e.g., during tuning of the frequency synthesizer 102 and/or the oscillator 110, the energy supply to the active components of the high-frequency module 112 can be switched on in an additional step/procedure S4. The energy-supply module 114 can be correspondingly actuated by the control unit/device 104 for this exemplary purpose, for example, by activating the second output 117 of the energy-supply module 114.

In a further step procedure S5, the control unit/device unit 104 waits for a certain definable waiting time. For example, the exemplary waiting time may be stored in the control unit/device 104 and/or a corresponding memory. Such exemplary waiting time may, for example, also be determined and/or dynamically adapted by the control unit/device 104, e.g., on the basis of the target value or the like. The exemplary waiting time should be of such a length and/or selected such that the frequency of the oscillator 110 and/or of the frequency synthesizer 102 has reached the target value, e.g., is at the starting frequency, at the end of the waiting time or when the waiting time is over. Thus, the high-frequency module 112 is therefore in a settled state once the supply voltage has been switched on and/or the energy-supply module 114 has been actuated.

In yet another step/procedure S6, the control signal (lock detect signal) of the phase-locked element 108 is queried by the control unit/device 104. For example, once the waiting time is over, in step/procedure S6, the control unit/device 104 can determine whether the control signal is being provided by the phase-locked element 108 at the signal output 107. This can mean that, in step/procedure S6, the frequency of the oscillator signal can be checked to see whether it corresponds to the target value, the oscillator 110 has therefore arrived at the starting frequency and is in the settled state. The frequency synthesizer 102 can therefore also be checked to determine whether it is ready for performing, tuning and/or passing through the frequency sweep.

If—in step/procedure S6—the control signal is provided by the phase-locked element 108, the fill level measurement can be started in step/procedure S7 and the frequency sweep is passed through, for example, i.e. in response to the presence of the control signal. For example, in step/procedure S7, a fill level measurement can be carried out by emitting a measurement signal via the antenna 113 and/or by receiving a radar signal reflected at a filling material. In contrast, if in step S6 the control signal is not provided by the phase-locked element 108, in step/procedure S8, the measurement routine may be interrupted or an additional waiting time can be waited for and/or added to the measurement routine, for example, by carrying out step/procedure S5 once again. Further, in a further step/procedure S9, the energy supply to the frequency synthesizer 102 and to the high-frequency module 112 may be switched off by correspondingly re-actuating the energy-supply module 114 once the frequency sweep is successfully passed through, for example.

During most or during the entire measurement routine and/or as the frequency sweep is passed through, the control signal can be continuously monitored by the control unit/device 104 so that, in the event of a malfunction, immediate action can be taken and/or the measurement may optionally be discarded. In the same or similar manner, the control signal of the phase-locked element 108 of the radar fill level measurement device 100 according to the exemplary embodiment of the present disclosure can be used to check the function of the frequency synthesizer 102.

Figure 3:
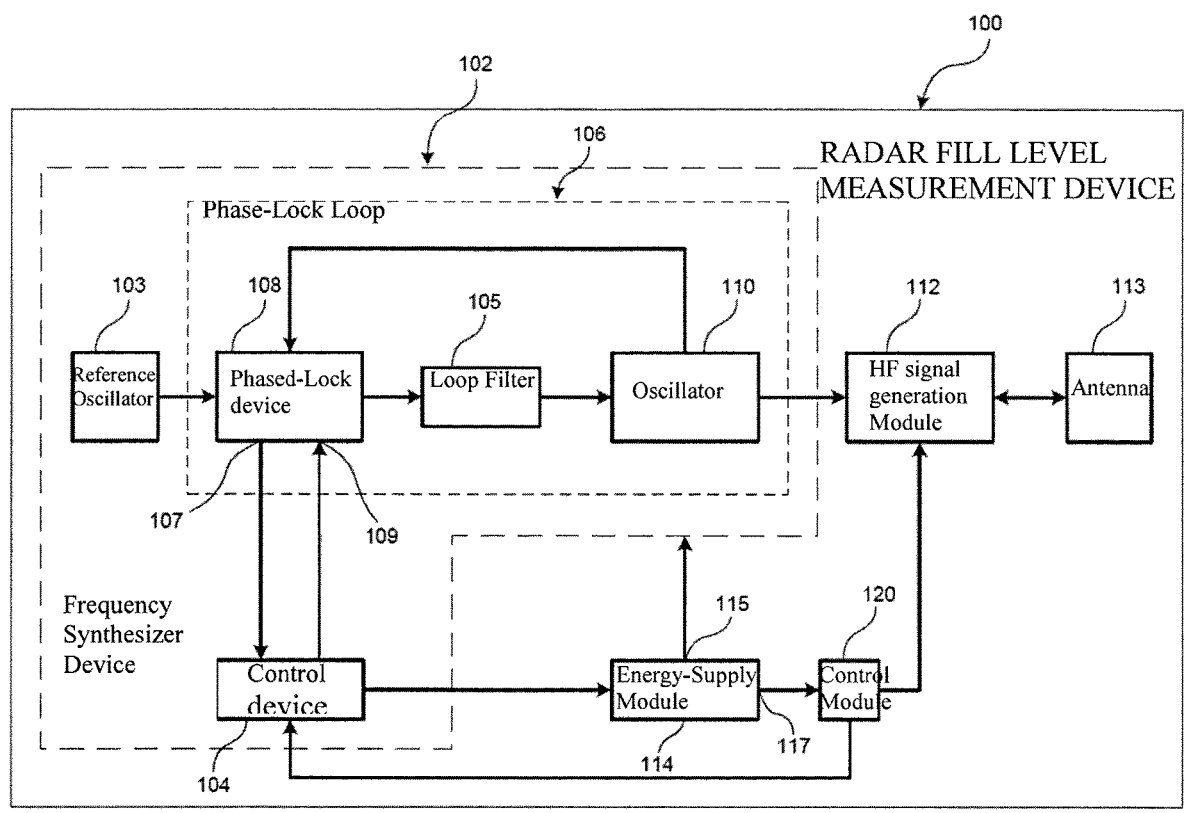
FIG. 3 is a block diagram of a radar fill level measurement device according to another exemplary embodiment of the present disclosure.

FIG. 3 shows a block diagram of a radar fill level measurement device 100 according to another exemplary embodiment of the present disclosure. Unless stated otherwise, the radar fill level measurement device 100 in FIG. 3 has the same elements and features as the radar fill level measurement device 100 in FIG. 1. Further, unless stated otherwise, the radar fill level measurement device 100 in FIG. 3 is also operated in the manner illustrated in FIG. 2.

In addition to the components shown in FIG. 1, the radar fill level measurement device 100 illustrated in FIG. 3 can comprise a control module 120 for monitoring electrical energy supplied to the high-frequency module 112 by the energy-supply module 114. The control module 120 can be configured to emit a control signal to the control unit/device 104 if preset values for the energy supply to the high-frequency module 112 are exceeded or fallen below. The control module 120 can therefore be placed between the energy-supply module 114 and the high-frequency module 112. The control module 120 can comprise an ampere meter or a commonly used sensor and/or a voltage meter, e.g., for determining a current strength and/or a voltage supplied to the high-frequency module 112.

Unlike checking the functionality of the frequency synthesizer 102 using the control signal, it may be more difficult to check the functionality of the high-frequency module 112 since, in analogue active components of the high-frequency module 112, e.g., a frequency multiplier, mixer and/or amplifier, digital output signals are generally not available for checking the function of said high-frequency module. A possible suitable indicator of the correct function of the components of the high-frequency module 112 can be the maintenance of certain voltage limits and/or current limits of the energy supply. For example, it may be assumed that if the supply voltage and/or current consumption of a component of the high-frequency module 112 is, e.g., too low, the function of the high-frequency module 112 can also be affected.

Using the exemplary radar fill level measurement device 100 shown in FIG. 3, the exemplary functionality of the high-frequency module 112 can thus be advantageously be checked before emitting a measurement signal and/or may be advantageously continuously checked during operation. During the sequence of the exemplary measurement procedure or method shown in FIG. 2, the functionality of the high-frequency module 112 can be checked by the control module 120, e.g., immediately before and/or at the same time as the presence of the control signal in step S6 is checked for. Therefore, in step/procedure S6 of FIG. 2, in addition to querying the presence of the control signal, it is also possible to query and/or check whether the values provided for the energy supply, e.g., the current supply values and/or the voltage supply values determined by the control module 120, of the high-frequency module 112 lie within the defined limits. If this is the case and the control signal is also present in step S6, the frequency sweep may be passed through, as indicated in FIG. 2. If, however, values for the energy supply lie outside the provided values, e.g., current supply values and/or voltage supply values of the high-frequency module 112 are outside the specified limits, after an additional optional waiting time the measurement routine is interrupted, and is restarted in step/procedure S5 or may be restarted right from the beginning.

Figure 4:
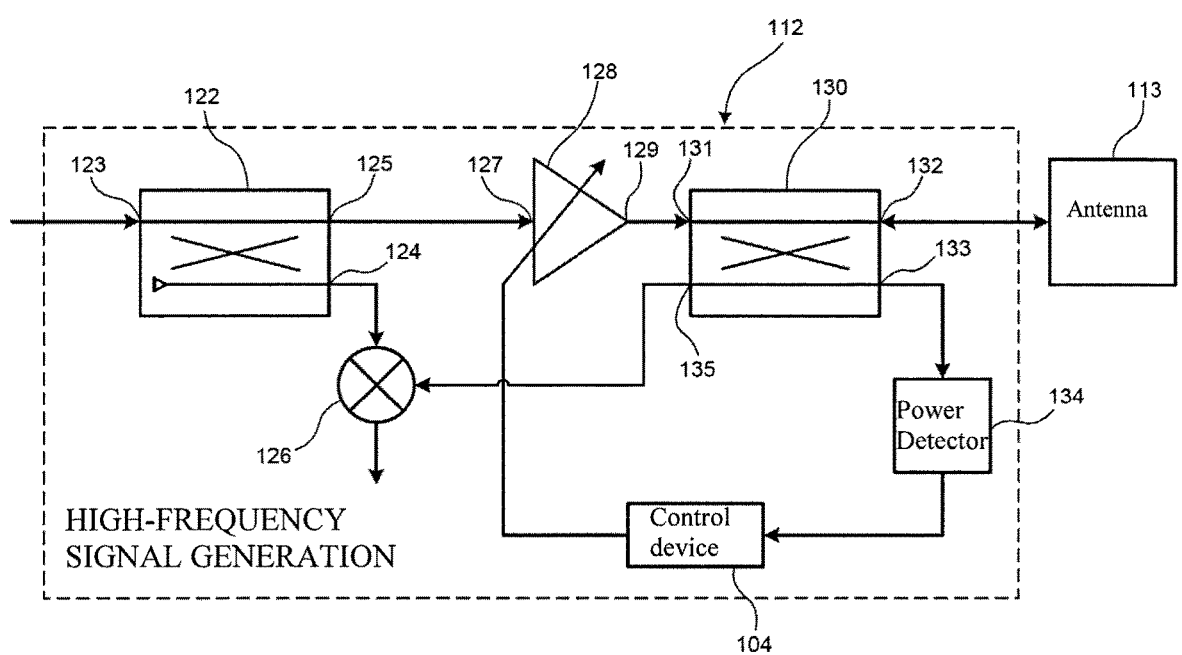
FIG. 4 is a schematic diagram of a high-frequency module for a radar fill level measurement device according to yet another exemplary embodiment of the present disclosure.

FIG. 4 shows a schematic diagram of the high-frequency module 112 for the exemplary radar fill level measurement device 100 according to an exemplary embodiment of the present disclosure. Unless stated otherwise, the high-frequency module 112 shown in FIG. 4 has the same elements and features as the high-frequency module 112 indicated in FIGS. 1 and 3. In particular, the high-frequency module can, for example, comprise one or more frequency multipliers, mixers, amplifiers and/or couplers, or directional couplers in each case.

For example, the high-frequency module 112 can comprise a first coupler 122, to which the oscillator signal of the frequency synthesizer 102 or of the oscillator 110 can be supplied using, e.g., an input 123. The first coupler 122 may be formed as or include a power divider 122, for example, and can be configured to couple out some of the signal power of the oscillator signal and supply it to a mixing apparatus 126 or a mixer 126 via an output 124. Another frequency conversion can also take place between an output of the frequency synthesizer 102 and the input 123 of the first coupler 122, for example using a multiplier and/or a mixer.

An output 125 of the first coupler 122 can be connected to an input 127 of a power regulator 128 of the high-frequency module 112. The oscillator signal can therefore be conducted or provided from the frequency synthesizer 102 to the first coupler 122, with some of the power being coupled out and the transmission signal being generated on the basis of the oscillator signal, and the transmission signal can be supplied to the power regulator 128. The power regulator 128 can be formed as or include a variable and/or adaptive amplifier, whereas it is possible to adjust the amplification of the transmission signal using, e.g., the control unit/device 104. Alternatively or in addition, the power regulator 128 can also be formed as or include a variable and/or adaptive attenuator.

The transmission signal can be supplied to an input 131 of a second coupler or power distributer 130 of the high-frequency module 112 via an output 129 of the power regulator 128.

An output 132 of the second coupler 130 can be coupled to the antenna 113, via which the transmission signal can then be emitted in the form of a measurement signal in order to carry out the actual fill level measurement.

Another output 133 of the second coupler 130 can be connected to a power detector 134 of the high-frequency module 112 so that some of the power of the transmission signal may be supplied to the power detector 134 via the additional output 133. The power detector 134 can be connected to the control unit/device 104. The power detector 134 can be configured to generate a signal that correlates with the power of the transmission signal and to supply it to the control unit/device 104. With respect to the portion of the power of the transmission signal coupled out via the second coupler 130, the control unit/device 104 can then determine, calculate and/or ascertain the power of the transmission signal. Therefore, the transmission power of the high-frequency module 112 and/or the power of the transmission signal can advantageously be checked by the power detector 134 and the control unit/device 104.

The second coupler 130 can comprise an output 135, via which a radar signal received via the antenna 113 and reflected at a filling material, for example, can be supplied to the mixing apparatus 126. On the basis of the signals supplied to the mixing apparatus 126 via the output 124 of the first coupler 122 and via the output 135 of the second coupler 130, the mixing apparatus 126 can mix an intermediate frequency signal that may be further processed in order to ascertain and/or determine the fill level.

According to another exemplary embodiment of the radar fill level measurement device 100 according to the present disclosure, e.g., with regard to clocked operation, the control unit/device 104 can be configured to reduce or minimize the power of the transmission signal and keep such power at a low level by adjusting the power control 128 during the settling time of the frequency synthesizer 102 and/or the oscillator 110. This can be done, e.g., until the frequency of the oscillator signal has reached the target value, and/or to set a minimum value for the amplification and only to increase the amplification to the desired value after the settling time and/or when the control signal is present. Alternatively or in addition, the control unit/device 104 can be configured to increase the power of the transmission signal to and/or adjust it to a target power value, e.g., to set the desired amplification value, immediately before carrying out a fill level measurement. On the one hand, the undesired emission of a measurement signal may therefore be prevented and, on the other hand, energy may be saved.

The mode of operation of the high-frequency module 112 can be as follows. The high-frequency module 112 shown in FIG. 4 comprises the components shown as a block diagram may advantageously be used in the exemplary radar fill level measurement device 100 in order to measure the fill level using FMCW and/or SFCW modulation. The high-frequency module 112 illustrated in FIG. 4 can therefore be used in the radar fill level measurement devices 100 in FIGS. 1 and 3. For reasons of clarity, FIG. 4 does not explicitly show an energy supply to the active components of the high-frequency module 112. For example, the oscillator signal arrives at the first coupler 122, where it is divided into a local oscillator (LO) component or an LO signal for the mixing apparatus 126 and a component that is forwarded to the second coupler 130 in the form of a transmission signal via the settable power regulator 128. In the second coupler 130, the transmission signal can be divided once again into a transmission component, which is forwarded to the antenna 113 in the form of a measurement signal, and a component that is conducted to the power detector 134. The measurement signal can be reflected at the filling material surface, arrives back at the antenna 113, and is forwarded to the mixing apparatus 126 via the second coupler 130. The signal received (e.g., via the antenna 113) can be converted into an intermediate frequency signal, which contains the distance information relating to the filling material surface, and is evaluated in the mixing apparatus 126 using which the LO signal.

An adaptive power control, which can be adjusted to match the echo ratios of the fill level measurement, can be carried out using the variable power regulator 128, for example. This distortion mitigation technique is described in European standard EN 302 729-1 V1.1.2 (2011-05), for example. In addition, during the settling time and/or when tuning the phase-locked loop 106, the amplification of the variable power regulator 128 can be set to the lowest value. Unwanted emissions before the start of the actual frequency sweep can therefore be reduced or minimized. The desired amplification value can likely be set and the transmission power raised only just before the start of the frequency sweep. The power regulator 128 can be controlled by the control unit/device 104, for example.

By evaluating the power detector 134, for example using which the control unit/device 104, using known coupling damping in the second coupler 130, conclusions may be drawn about the transmission power that is supplied to the antenna 113 and emitted.

Figure 5:
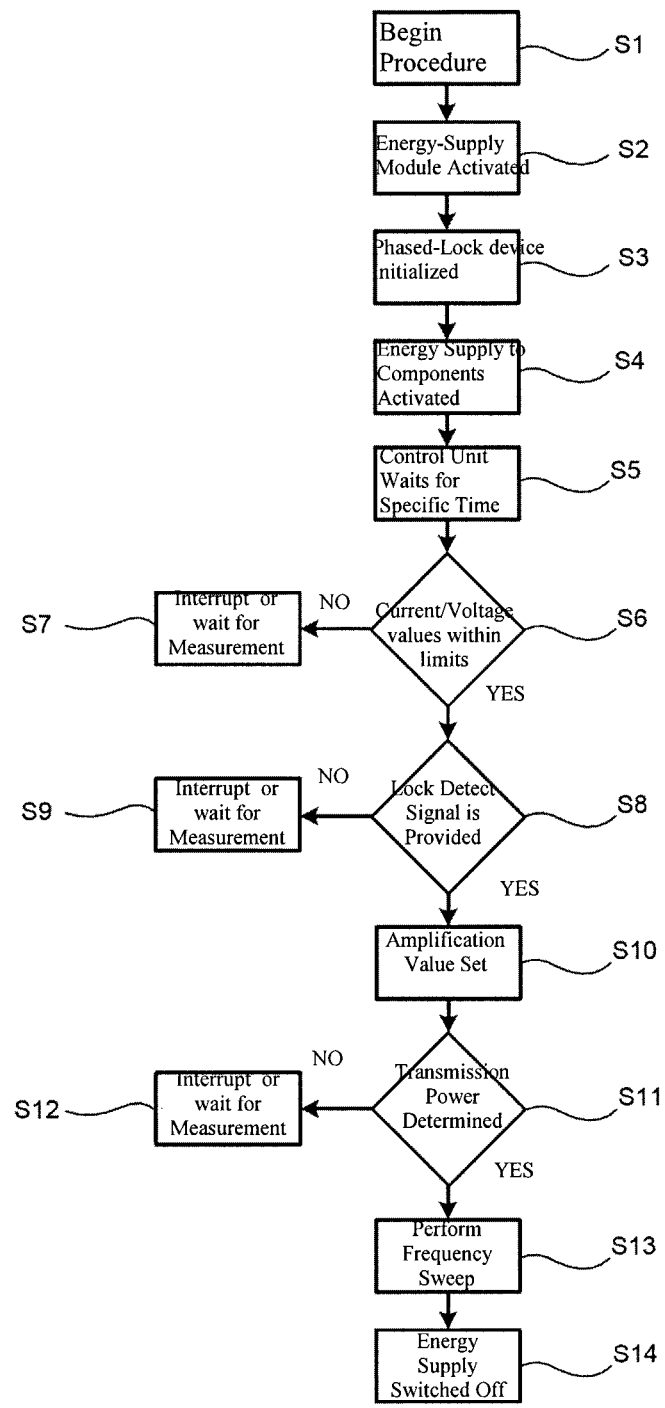
FIG. 5 is a flow diagram illustrating steps and/or procedures of a method for operating the radar fill level measurement device comprising the high-frequency module shown in FIG. 4 according to yet another exemplary embodiment of the present disclosure.

FIG. 5 illustrates a flow diagram for a method for operating a radar fill level measurement device 100 comprising the exemplary high-frequency module shown in FIG. 4 according to another exemplary embodiment of the present disclosure. For example, steps/procedures S1, S2 and S3 shown in FIG. 5 correspond to those provided in FIG. 2, and therefore reference is made to the exemplary embodiments of FIG. 2. For example, during the settling time, i.e. when tuning the frequency synthesizer 102 and/or the oscillator 110, the energy supply to the active components of the high-frequency module 112 can be switched on in an additional step, S4, by correspondingly actuating the energy-supply module 114. In addition, the power regulator 128 can be set to, e.g., its lowest amplification value. This can ensure or facilitate that unwanted emissions are reduced or minimized.

This can be in turn followed by waiting for a preset waiting time in step/procedure S5. This exemplary waiting time should be set such that the frequency of the oscillator signal has reached the target value at the end of the waiting time, so that the oscillator 110 can be at its starting frequency, and the high-frequency module 112 can be in a settled state after the supply voltage and/or energy supply has been switched on by actuating the energy-supply module 114.

In step/procedure S6 of FIG. 5, the control unit/device 104 first queries whether the current and voltage values for the high-frequency module 112 determined in the control module 120 lie within the set limits. If this is not the case, the measurement routine may be interrupted in step/procedure S7 of FIG. 5. Alternatively or in addition, an additional waiting time can also be included and, for example in such step/procedure S5, e.g., added back into the measurement routine, i.e. step S5 may be carried out once again.

In step/procedure S8 of FIG. 5, the control signal of the phase-locked element 108 can be queried by the control unit/device 104. If the control signal is not present, the measurement routine may be interrupted in step S9, or alternatively re-started in step S5.

If the control signal is present, the amplification of the variable power regulator 128 can be set to the desired value in step S10, so that sufficient transmission power is available for measuring the fill level. The current transmission power or power of the transmission signal can be determined in the power detector 134, and can be queried and/or determined in step/procedure S11 by the control unit/device 104. If the transmission power is outside the specified range, the measurement routine is interrupted in step/procedure S12 or is alternatively restarted in step S5.

If the transmission power is in the preset range, the frequency sweep can instead be passed through in step/procedure S13. If the frequency sweep of the SFCW or FMCW transmission signal has been passed through, the energy or voltage supplies to the frequency synthesizer 102 and the high-frequency module 112 are switched off again in step S14 by actuating the energy-supply module 114. The current and voltage values at the high-frequency module 112, the control signal and/or the power of the transmission signal are preferably continuously checked as the frequency sweep is passed through so that, in the event of a malfunction, immediate action may be taken or the measurement may optionally be discarded.

In summary, the exemplary radar fill level measurement device 100 according to the present disclosure may be used to check and/or check the function of partial circuits, e.g., of the frequency synthesizer 102, the high-frequency module 112 and/or the power of the transmission signal before and/or as the modulated measurement signal is being emitted in order to measure the fill level during clocked operation of the radar fill level measurement device 100. For example, the frequency synthesizer 102 can be monitored using the control signal as a condition for the subsequent emission of the measurement signal. Furthermore, undesired emission of measurement signals during clocked measurement operation can be reduced or prevented by switching the variable power regulator 128 from a low amplification to the desired, higher amplification immediately before the start of the frequency sweep, e.g., also during the settling time of the frequency synthesizer 112.

It should be pointed out that "comprising" and "having" do not rule out the possibility of other elements or steps and "one" or "a" does not rule out the possibility of a plurality.

Furthermore, it should be pointed out that features or steps described with reference to one of the above embodiments may also be used in combination with other features or steps of other above-described embodiments. Reference signs in the claims should not be considered to be restrictive.

Further, it is noted that the foregoing merely illustrates the exemplary principles of the present disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties, as applicable.

What is claimed is:

1. A radar fill level measurement device for determining a fill level of a filling material, the radar fill level measurement device comprising:
   a frequency synthesizer configured to generate an oscillator signal;
   a high-frequency signal generation module configured to generate a transmission signal based on the oscillator signal, and
   an energy-supply module configured to supply electrical energy to the frequency synthesizer and the high-frequency signal generation module,
   wherein the frequency synthesizer comprises a control device and a phase-locked loop which comprises a phase-locked device and an oscillator,
   wherein the phase-locked loop is configured to adjust a frequency of the oscillator signal to a target value,
   wherein the phase-locked device is configured to provide a control signal to the control device when the frequency of the oscillator signal has reached the target value; and
   wherein the control device is configured to, during a settling time in which the frequency of the oscillator signal is adjusted to the target value, actuate the energy-supply module to provide the electrical energy to the high-frequency signal generation module before the control signal is provided by the phase-locked device.

2. The radar fill level measurement device according to claim 1, wherein the control device is configured to determine the fill level in response to the control signal.

3. The radar fill level measurement device according to claim 1, wherein the control device is configured to continuously monitor the control signal while a frequency sweep is performed by the frequency synthesizer.

4. The radar fill level measurement device according to claim 1, wherein the control device is configured to determine the fill level after at least one of a definable, a programmable and a dynamically adaptable waiting time is over.

5. The radar fill level measurement device according to claim 1,
   wherein the energy-supply module comprises a first output configured to supply the electrical energy to the frequency synthesizer and a second output configured to supply the electrical energy to the high-frequency signal generation module, and
   wherein the first output and the second output are actuatable independently of one another by the control device.

6. The radar fill level measurement device according to claim 1,
   wherein the energy-supply module comprises a first energy-supply device configured to supply the electrical energy to the frequency synthesizer, and a second energy-supply device configured to supply the electrical energy to the high-frequency signal generation module, and
   wherein the first energy-supply device and the second energy-supply device are actuatable independently of one another by the control device.

7. The radar fill level measurement device according to claim 1, wherein the frequency synthesizer further comprises a reference oscillator configured to output a reference signal to the phase-locked loop.

8. The radar fill level measurement device according to claim 1, wherein the phase-locked loop further comprises a loop filter configured to filter a signal that is passed from the phase-locked device to the oscillator.

9. The radar fill level measurement device according to claim 1, further comprising:
   a control module configured to monitor the electrical energy supplied to the high-frequency signal generation module by the energy-supply module, wherein the control module is configured to output a control signal to the control device if preset values for the energy supply to the high-frequency signal generation module are exceeded or fall below a predetermined value.

10. The radar fill level measurement device according to claim 1,
   wherein the high-frequency signal generation module comprises a first coupler, a second coupler, a power regulator configured to adjust power of the transmission signal, and a power detector configured to determine and check the power of the transmission signal,
   wherein an input of the first coupler is connected to an output of the frequency synthesizer,
   wherein an output of the first coupler is connected to an input of the power regulator,
   wherein an output of the power regulator is connected to an input of the second coupler, and
   wherein the second coupler is configured to supply at least a part of the power of the transmission signal to the power detector.

11. The radar fill level measurement device according to claim 10,
   wherein the power detector is connected to the control device,
   wherein the control device is configured to determine the power of the transmission signal based on a signal that is provided by the power detector, and which correlates with the power of the transmission signal, and
   wherein the control device is further coupled to the power regulator, and configured to adjust the power regulator.

12. The radar fill level measurement device according to claim 11, wherein the control device is configured to reduce or minimize the power of the transmission signal during a settling time by adjusting the power regulator.

13. The radar fill level measurement device according to claim 11, wherein the control device is configured to increase the power of the transmission signal to a target power value immediately before a fill level measurement is carried out.

14. The radar fill level measurement device according to claim 10, wherein the power regulator is at least one of a variable amplifier or a variable attenuator.

15. A method for operating a radar fill level measurement device which comprises a frequency synthesizer configured to generate an oscillator signal, a high-frequency signal generation module configured to generate a transmission signal based on the oscillator signal, and an energy-supply module configured to provide electrical energy to the frequency synthesizer and the high-frequency signal generation module, the method comprising:
- actuating the energy-supply module to provide the electrical energy to the frequency synthesizer;
- adjusting a frequency of the oscillator signal to a preset target value using a phase-locked loop of the frequency synthesizer;
- providing a control signal using a phase-locked device of the phase-locked loop when the frequency of the oscillator signal matches the preset target value; and
- during a settling time in which the frequency of the oscillator signal is adjusted to the preset target value, actuating the energy-supply module to supply the electrical energy to the high-frequency signal generation module before the control signal is provided.

16. A control device that is part of a measurement device, the measurement device comprising a frequency synthesizer configured to generate an oscillator signal, a high-frequency signal generation module configured to generate a transmission signal based on the oscillator signal, and an energy-supply module configured to provide electrical energy to the frequency synthesizer and the high-frequency signal generation module, wherein the control device executes computer software which configures the control device to perform procedures comprising:
- actuating the energy-supply module to provide the electrical energy to the frequency synthesizer;
- adjusting a frequency of the oscillator signal to a preset target value using a phase-locked loop of the frequency synthesizer;
- providing a control signal using a phase-locked device of the phase-locked loop when the frequency of the oscillator signal matches the preset target value; and
- during a settling time in which the frequency of the oscillator signal is adjusted to the preset target value, actuating the energy-supply module to supply the electrical energy to the high-frequency signal generation module before the control signal is provided.

17. A non-transitory computer-readable medium which includes a computer software program thereon, which the computer software is accessed and executed on a control device of a radar fill level measurement device comprising a frequency synthesizer configured to generate an oscillator signal, a high-frequency signal generation module configured to generate a transmission signal based on the oscillator signal, and an energy-supply module configured to provide electrical energy to the frequency synthesizer and the high-frequency signal generation module, wherein, when executed on the control device, the computer software program instructs the radar fill level measurement device to perform procedures comprising:
- actuating the energy-supply module to provide the electrical energy to the frequency synthesizer;
- adjusting a frequency of the oscillator signal to a preset target value using a phase-locked loop of the frequency synthesizer;
- providing a control signal using a phase-locked device of the phase-locked loop when the frequency of the oscillator signal matches the preset target value; and
- during a settling time in which the frequency of the oscillator signal is adjusted to the preset target value, actuating the energy-supply module to supply the electrical energy to the high-frequency signal generation module before the control signal is provided.

* * * * *